US012303883B2

(12) United States Patent
Kunsch et al.

(10) Patent No.: US 12,303,883 B2
(45) Date of Patent: May 20, 2025

(54) PIPETTE FOR USE WITH A PIPETTE TIP WITH AN INTEGRATED PLUNGER

(71) Applicant: Eppendorf AG, Hamburg (DE)

(72) Inventors: Matthias Kunsch, Hamburg (DE); Burkhardt Reichmuth, Hamburg (DE); Holger Link, Hamburg (DE)

(73) Assignee: Eppendorf AG, Hamburg (DE)

( * ) Notice: Subject to any disclaimer, the term of this patent is extended or adjusted under 35 U.S.C. 154(b) by 2 days.

(21) Appl. No.: 17/375,568

(22) Filed: Jul. 14, 2021

(65) Prior Publication Data

US 2022/0016618 A1 Jan. 20, 2022

(30) Foreign Application Priority Data

Jul. 14, 2020 (DE) ..................... 10 2020 118 587.1

(51) Int. Cl.
*B01L 3/02* (2006.01)

(52) U.S. Cl.
CPC ....... *B01L 3/0224* (2013.01); *B01L 2300/123* (2013.01)

(58) Field of Classification Search
CPC .......................... B01L 3/0224; B01L 2300/123
See application file for complete search history.

(56) References Cited

U.S. PATENT DOCUMENTS 4,967,604 A 11/1990 Arpagaus et al.
5,192,511 A 3/1993 Roach
5,770,160 A 6/1998 Smith et al.
2020/0215528 A1 7/2020 Seippel et al.
2020/0215529 A1* 7/2020 Tesch .................... B01L 3/0286

FOREIGN PATENT DOCUMENTS

FR 2383704 A1 10/1978

OTHER PUBLICATIONS

EP 21185307.2; filed Jul. 13, 2021, European Search Report dated Dec. 2, 2021 (9 Pages).
DE 102020118587.1; filed Jul. 14, 2020, DE Office Action dated Mar. 25, 2021 (10 Pages).

* cited by examiner

*Primary Examiner* — Jill A Warden
*Assistant Examiner* — Alex Ramirez
(74) *Attorney, Agent, or Firm* — Barclay Damon LLP

(57) ABSTRACT

A pipette comprises a housing extending from a lower end to an upper end and a neck extending from the lower end of the housing and configured to hold a pipette tip. A stroke rod comprising an upper end and a lower end is configured to displace a tip plunger in the pipette tip. A drive apparatus is configured to displace the stroke rod to: (1) aspirate a liquid specimen into the pipette tip held on the neck; and (2) to eject the specimen from the pipette tip by means of a tip plunger positively connected to the stroke rod. At least one locking sleeve is arranged coaxially with the stroke rod and configured to be displaceably guided toward the stroke rod in the housing The locking sleeve is configured to inhibit release of a tip plunger from the stroke rod.

16 Claims, 13 Drawing Sheets

PIPETTE FOR USE WITH A PIPETTE TIP WITH AN INTEGRATED PLUNGER

CROSS REFERENCE TO RELATED INVENTION

This application is based upon and claims priority to, under relevant sections of 35 U.S.C. § 119, German Patent Application No. 110 2020 118 587.1, filed Jul. 14, 2020, the entire contents of which are hereby incorporated by reference.

FIELD OF TECHNOLOGY

The invention relates to a pipette for use with a pipette tip with an integrated plunger.

BACKGROUND

Pipettes are utilized in particular in scientific and industrial laboratories in medical, molecular biological and pharmaceutical areas of application for dosing selected volumes of liquids. The liquids can in particular be homogeneous (single phase) liquids consisting of a single liquid component, or a homogeneous mixture of a plurality of liquid components (solutions). Furthermore, the liquids can be heterogeneous (multiphase) mixtures of a liquid with another liquid (emulsions) or a solid (suspensions).

Pipettes have a stick-shaped pipette housing with a neck (attachment) on the lower end for clamping on a pipette tip. The neck is frequently a conical, cylindrical or sectionally conical and cylindrical projection, and is also referred to as a “working cone”. A pipette tip is a hollow tube with a tip opening in the lower end and a mounting opening in the upper end with which the pipette tip can be clamped to the neck. The liquid is drawn into the pipette tip and discharged therefrom. The drawing and discharging of liquid is controlled by means of the pipette. Fixed volume pipettes serve to pipette constant volumes. With variable pipettes, the volume to be dosed is adjustable. A mechanical counter is used to display the set volume. To set the volume, the stroke of a drive apparatus is adjustable by means of a setting apparatus that is coupled to the counter. After use, the pipette tip is detached from the attachment, and can be exchanged for a fresh pipette tip. In this way, cross-contamination during subsequent pipetting can be avoided.

Air cushion pipettes have a plunger/cylinder system in the pipette housing that is connected by a channel to a through-hole in the neck. Pipette tips for air cushion pipettes (air cushion pipette tips) do not have an integrated plunger. By displacing the plunger by means of the drive apparatus in the cylinder, an air cushion is moved for aspirating liquid into a pipette tip clamped onto the neck and ejecting it therefrom. A disadvantage with air cushion pipettes are dosing errors arising from the change in the length of the air cushion due to the weight of the aspirated liquid and the differences in temperature, air pressure and humidity. Contamination of the pipette with aerosols can also be problematic.

Positive displacement pipettes are used with pipette tips having integrated plungers (positive displacement pipette tips). Pipette tips with an integrated plunger comprise a tip plunger that is inserted into the pipette tip and that can be pulled further out of the pipette tip in order to aspirate liquid and pushed further into the pipette tip in order to dispense liquid. Positive displacement pipettes have a neck for fastening the pipette tip, and a drive apparatus that can be coupled to the integrated plunger (tip plunger) for moving the plunger. The plunger comes directly into contact with the liquid so that the effects of an air cushion do not exist. Positive displacement pipettes are in particular suitable for dosing liquids with a high vapor pressure, high viscosity or high density, and applications in molecular biology in which freedom from aerosols is important in order to avoid contamination. Air cushion or positive displacement pipette tips for single use or reuse consist of plastic or of glass.

With the Biomaster® 4830 positive displacement pipette by Eppendorf AG, the drive apparatus has a stroke rod to displace a plunger in a pipette tip that has a hollow lower stroke rod part and an upper stroke rod part inserted from the top into the lower stroke rod part. The upper stroke rod part is connected to an operating element that projects out of the upper end of the pipette housing. A Mastertip® pipette tip by Eppendorf AG can be clamped onto a neck of the pipette. By pressing the operating element, the stroke rod can be shifted downward so that an upper end of the plunger rod of a tip plunger of the pipette tip is pressed into the lower stroke rod part. When displacing the stroke rod downward to a lower stop, a spring apparatus is pretensioned. After the operating element is released, the spring apparatus displaces the stroke rod to an upper stop, wherein the tip plunger is entrained and liquid can be aspirated into the pipette tip. The aspirated liquid can be discharged by pressing the operating element to the lower stop again. To release the pipette tip, the user must press with greater force on the operating element so that another spring apparatus compresses, the upper stroke rod part in the lower stroke rod part is displaced downward, presses the plunger out of the lower stroke rod part, and presses the pipette tip off of the neck.

To release the pipette tip from the pipette, the spring effect of the spring apparatuses must be overcome. This can be tiring for the user, in particular if the pipette tips have to be exchanged frequently. Furthermore, when dispensing highly viscous liquids and when quickly dispensing liquids from the pipette tip, the pipette tip can become detached from the neck due to the increased flow resistance in the tip opening.

DE 27 11 124 C2 describes a pipette for use with a pipette tip with an integrated plunger, which pipette is connectable via a bayonet lock to a pipette tip. The plunger has a plunger rod that is securely held by a collet of the pipette. In the closed position, the collet is compressed by a tubular guide ring of the pipette so that it clamps around the plunger rod. When the guide ring is moved upward relative to the collet, the collet consisting of three fingers is opened on account of its elasticity and releases the plunger rod so that same can fall out loosely. The non-positive connection between the plunger rod and the collet can unintentionally become released. Furthermore, the bayonet lock must be manually actuated and this can lead to contamination.

U.S. Pat. No. 4,474,071 describes another pipette for use with a pipette tip with an integrated plunger, which pipette comprises a neck for mounting the pipette tip and a collet having elastically deflectable fingers and a sleeve that can be slid onto the fingers for securely clamping the upper end of a plunger. With this pipette, too, the non-positively secured plunger can unintentionally become released. Moreover, a great deal of force can be required to connect the pipette and the piston.

According to US 2016/0271602 A1, a helical spring is arranged between the fingers in order to elastically push same apart.

BRIEF SUMMARY OF THE INVENTION

Proceeding from this, the object of the invention is to provide a pipette for use with a pipette tip with an integrated plunger, wherein the forces for connecting the pipette to the tip plunger and for releasing the tip plunger from the pipette are reduced and yet the tip plunger is held sufficiently securely on the pipette so that it does not become detached from the pipette or move in its holder when highly viscous liquids are pipetted and during fast pipetting.

An embodiment of a pipette for use with a pipette tip comprises a rod-shaped pipette housing, a neck at the lower end of the pipette housing for holding a pipette tip, and a stroke rod for displacing the tip plunger in the pipette tip. The stroke rod comprises, at the lower end thereof, a receiving means for insertion of the upper end of the tip plunger of a pipette tip that is held on the neck and that engages by means of the tip plunger in a through-hole in the neck, or the stroke rod can be inserted by the lower end thereof into a receiving means on the upper end of the tip plunger of a pipette tip that is held on the neck and that engages by means of the tip plunger in a through-hole in the neck. The stroke rod comprises, on the lower end, first means for positive connection with the tip plunger. The tip plunger comprises, on the upper end, second means for positively connecting the tip plunger to the first means, so that the tip plunger can be inserted into the receiving means of the stroke rod prior to positive connection with the stroke rod by means of the lower end of the stroke rod elastically expanding, or the stroke rod can be inserted into the receiving means of the tip plunger prior to positive connection with the tip plunger by means of the upper end of the tip plunger elastically expanding. The embodiment further comprises a drive apparatus configured to displace the stroke rod in order to aspirate a liquid specimen into a pipette tip held on the neck and in order to eject the specimen from the pipette tip by means of a tip plunger positively connected to the stroke rod. At least one locking sleeve is arranged coaxially with the stroke rod and is displaceably guided toward the stroke rod in the pipette housing. The at least one locking sleeve is configured be moved into a locked position in which it borders, on the outside, a lower end of the stroke rod that can expand by means of the upper end of a tip plunger being inserted into the receiving means of the stroke rod or an upper end of the tip plunger that can expand by means of the lower end of the stroke rod being inserted into a receiving means of the tip plunger, as a result of which the locking sleeve prevents release of a tip plunger positively connected to the stroke rod from the stroke rod, and the locking sleeve can be displaced upward out of the locked position so that the stroke rod or the upper end of the tip plunger is at least partially released and the tip plunger can be detached from the stroke rod.

In an embodiment, the first means for positive connection of the stroke rod and the second means for positive connection of the tip plunger are designed to be complementary to one another so that they can enter a positive connection with one another when the pipette tip is held on the neck. The connection of the tip plunger to the stroke rod is facilitated in that the stroke rod can be elastically expanded by means of the upper end of the tip plunger being inserted or the tip plunger can be elastically expanded by the penetration of the lower end of the stroke rod. The elastic expansion is effectuated by the forces acting between the first and second means for positive connection when the lower end of the stroke rod and the upper end of the tip plunger are pushed one into the other. The elastic expansion is entirely or partially reversed if, when the tip plunger and stroke rod are pushed one into the other, the second means for positive connection of the tip plunger enter the positive connection with the first means for positive connection of the stroke rod.

Then, the at least one locking sleeve is displaced into the locked position. As a result, the tip plunger is secured on the stroke rod, since the locking sleeve in the locked position prevents the lower end of the stroke rod or the upper end of the plunger rod from elastically expanding, which is required for releasing the positive connection between the stroke rod and the plunger rod. To eject the pipette tip from the pipette, the locking sleeve is taken out of the locked position so that it at least partially releases the lower end of the stroke rod or the upper end of the plunger rod and the lower end of the stroke rod or the upper end of the plunger rod can be elastically expanded. Consequently, the positive connection can be released with little exertion of Three, and the pipette tip can be released from the neck.

According to an embodiment, the stroke rod has at least one slot running in the longitudinal direction at the lower end, and the locking sleeve, in the locked position, borders the stroke rod, or the locking sleeve, in the locked position, is designed to border a tip plunger that has at least one slot running it the longitudinal direction at the upper end and that is positively connected to the stroke rod, said bordering of the locking sleeve with the tip plunger taking place on the outside and in the region of the slot. According to the first variant, the stroke rod has at least one slot running in a longitudinal direction for the elastic expansion. In this case, the stroke rod can consist of a hard elastic or soft elastic material, such as a metal or a plastic. A stroke rod produced from a soft elastic material such as from silicone rubber, a thermoplastic elastomer or rubber can also have sufficient elasticity for elastic expansion without a slot. According to the second variant, the tip plunger has at least one slot running in a longitudinal direction at the upper end for the elastic expansion. In this case, the tip plunger can consist of a hard elastic plastic such as polypropylene or polyethylene, or soft elastic plastic. It is furthermore possible to produce a tip plunger from a soft elastic material at least at the upper end, for example from silicone rubber, a thermoplastic elastomer or from rubber so that it has sufficient elasticity for elastic expansion without a slot. The tip plunger can be produced by multi-component injection molding from a plurality of materials. In so doing, the various materials can be connected to each other positively and/or chemically. The locking sleeve is designed so that it does not deform when stressed with a radial force that is suitable for elastically expanding the stroke rod or the upper end of the tip plunger. The locking sleeve consists for example of a metal, or a hard elastic, or rigid plastic.

According to another embodiment, the locking sleeve is connected to a first operating element that projects from the pipette housing and can be displaced relative to the pipette housing in order to displace the locking sleeve downward into the locked position, and upward out of the locked position, by means of the first operating element being actuated. The displacement of the locking element into the locked position and upward out of the locked position is simplified for the user by means of the first operating element. In another embodiment that is structurally simpler, the locking sleeve is not connected to a first operating element, but is rather manually displaceable.

According to another embodiment, the pipette comprises an ejection apparatus that comprises an ejection rod which is guided inside an axial bore of the stroke rod so as to be displaceable in the longitudinal direction of the neck and is arranged with its lower end above the tip plunger when said tip plunger is positively connected to the stroke rod, and comprises a second operating element connected to the ejection rod in order to displace the ejection rod, wherein the ejection apparatus is configured to press the tip plunger off of the stroke rod and to press the pipette tip comprising the tip plunger off of the neck by displacing the ejection rod downward when the locking sleeve at least partially releases the lower end of the stroke rod or the upper end of the tip plunger. This facilitates the ejection of the pipette tip on the part of the user and prevents contamination, in particular because the user does not have to grasp the pipette tip in order to remove it from the pipette. In a structurally simple embodiment that does not have an ejection apparatus, the user can remove the pipette tip manually from the pipette.

According to another embodiment, the neck has first means for positive connection with a pipette tip so that a pipette tip, which has a second means for positively connecting the pipette tip to the first means for positively connecting the neck, can be pushed onto the neck with elastic constriction of the neck and/or with elastic expansion of the pipette tip before being positively connected to the neck, at least one locking sleeve is arranged coaxially with the neck and is displaceably guided toward the neck in the pipette housing, wherein the at least one locking sleeve can be displaced into a locked position in which it borders, on the inside, a neck that can be constricted by means of a pipette tip being pushed on and/or borders, on the outside, a pipette tip that can be expanded by being pushed onto the neck, as a result of which the locking sleeve prevents release of a pipette tip positively connected to the neck from the neck, and the locking sleeve can be displaced upward out of the locked position so that the neck and/or the pipette tip is at least partially released and the pipette tip can be detached from the neck. In this embodiment, the first means for positive connection of the neck and the second means for positive connection of the pipette tip are first and second coupling elements configured to be complementary to one another so that they can enter a positive connection with one another when the pipette tip assumes a particular position, on the neck. Connecting the pipette tip to the neck is facilitated in that the neck can be elastically constricted by pushing on the pipette tip and/or the pipette tip can be elastically expanded by the penetration of the neck. The elastic constriction and/or expansion is effectuated by the forces acting between the first and second means for positive connection when the pipette tip is pushed onto the neck. The elastic constriction and/or elastic expansion is entirely or partially reversed if, when the pipette tip is pushed onto the neck, the second means for positive connection of the pipette tip enter the positive connection with the first means for positive connection of the neck. Then, the at least one locking sleeve is displaced into the locked position. This secures the pipette tip on the neck, since the locking sleeve in the locked position prevents the neck from elastically constricting and/or prevents the pipette tip from elastically expanding, which is required for releasing the positive connection between the neck and the pipette tip. To eject the pipette tip from the pipette, the locking sleeve is taken out of the locked position so that it at least partially releases the neck and/or pipette tip and the neck can be elastically constricted and/or the pipette tip can be elastically expanded. Consequently, the positive connection can be released with little exertion of force, and the pipette tip can be released from the neck.

According to an embodiment, the neck has at least one slot running in the longitudinal direction and the locking sleeve, in the locked position, borders the neck on the inside and/or the locking sleeve, in locked position, is designed to border, on the outside, a pipette tip that has at least one slot running in the longitudinal direction at the upper end and that is positively connected to the neck. According to an embodiment, the neck has at least one slot running in a longitudinal direction for the elastic constriction. In this case, the neck can consist of a hard elastic or soft elastic material, such as a metal or a plastic. A neck produced from a soft elastic material such as from silicone rubber, a thermoplastic elastomer or rubber can also have sufficient elasticity for elastic constriction without a slot. According to the second variant, the pipette tip has at least one slot running in a longitudinal direction at the upper end for the elastic expansion. In this case, the pipette tip can consist of a hard elastic plastic such as polypropylene or polyethylene, or a soft elastic plastic. It is furthermore possible to produce a pipette tip from a soft elastic material at least at the upper end, for example from silicone rubber, a thermoplastic elastomer or from rubber so that it has sufficient elasticity for elastic expansion without a slot. The pipette tip can be produced by multi-component injection molding from a plurality of materials. In so doing, the various materials can be connected to each other positively and/or chemically. The locking sleeve is designed so that it does not deform when stressed with a radial force that is suitable for elastically constricting the neck and/or elastically expanding the pipette tip. The locking sleeve comprises for example of a metal, or a hard elastic, or rigid plastic.

According to another embodiment, the locking sleeve is arranged between the stroke rod and the neck and, in the locked position, borders, on the outside, the lower end of the stroke rod or the upper end of the tip plunger and, at the same time, borders the neck on the inside, as a result of which the locking sleeve prevents release of a tip plunger positively connected to the stroke rod from the stroke rod and, at the same time, prevents release of a pipette tip positively connected to the neck from the neck. As such, the positive connection of the tip plunger with the stroke rod and the positive connection of the pipette tip with the neck is secured by means of the same locking sleeve. This can save structural complexity in an alternative embodiment, the positive connection of the tip plunger with the stroke rod is secured by means of a first locking sleeve and the positive connection of the pipette tip with the neck is secured by means of a second locking sleeve. For this purpose, the second locking sleeve can border the neck on the inside or border a pipette tip mounted on the neck on the outside.

According to another embodiment, the locking sleeve and the ejection rod are connected to a gear apparatus that comprises the first operating element and the second operating element and is designed to control the displacement of the locking sleeve and the ejection rod in an opposite direction when at least one operating element is actuated, so that a tip plunger that is positively connected to the stroke rod is prevented from being detached from the stroke rod by means of the ejection rod being displaced upward and the locking sleeve being displaced downward, and the tip plunger can be detached from the stroke rod and the pipette tip can be detached from the neck by means of the locking sleeve being displaced upward and the ejection rod being displaced downward. By means of the gear apparatus, synchronized displacement of the locking sleeve and the ejection rod is enabled in opposite directions in order to either securely hold the tip plunger and, if applicable, the pipette tip on the pipette, or to release the secure hold of the tip plunger and, if applicable, the pipette tip and detach same from the pipette. This facilitates the use, on the part of the user, of the pipette tip with an integrated tip plunger.

According to another embodiment, when a pipette tip is being pressed off, the gear apparatus is designed to first displace the locking sleeve upward and then to press the tip plunger off of the stroke rod and the pipette tip off of the attachment by displacing the ejection rod downward. Consequently, the tip plunger is pressed off of the stroke rod and the pipette tip is pressed off of the neck only after the positive hold of the tip plunger on the stroke rod and, if applicable, of the pipette tip on the neck is released. According to another embodiment, the ejection rod already presses against the plunger rod when the locking sleeve is in the locked position.

According to another embodiment, the same operating element controls the displacement of the locking sleeve and the displacement of the ejection rod. In this embodiment, the first operating element is simultaneously the second operating element. According to another embodiment, the same operating element controls the drive apparatus. According to another embodiment, the operating element drives the drive apparatus.

This enables single-handed operation of the pipette without grasping. According to another embodiment, the pipette has an operating element configured to actuate the locking sleeve and the ejection apparatus, and another operating element different from this operating element configured to control the drive apparatus.

According to another embodiment, the gear apparatus comprises a curved support that is rotatably mounted in the pipette housing, a first sensing element that is guided on a first curve on the circumference of the curved support and projects from an ejection rod that is guided in the pipette housing so as to be displaceable in the longitudinal direction of the neck, and a second sensing element that is guided on a second curve on the circumference of the curved support and projects from a control rod that projects upward from the locking sleeve and forms a locking apparatus together with the locking sleeve that can be displaceably guided in the pipette housing in the direction of the neck. The gear apparatus further comprises an operating element that projects from the pipette housing and can rotate relative to the pipette housing. The curved support is configured such that, when the operating element is arranged in a start position, the locking sleeve, in a locked position, borders the lower end of the stroke rod or the upper end of the tip plunger on the outside and, if applicable, borders the neck on the inside and/or borders the pipette tip on the outside. As a result, the locking sleeve prevents release of a tip plunger that is positively connected to the stroke rod and, if applicable, of a pipette tip that is positively connected to the neck from the neck, and the locking sleeve can be displaced upward by means of the operating element being rotated so that the lower end of the stroke rod or the upper end of the tip plunger is at least partially released and, if applicable, the neck and/or the pipette tip is at least partially released and the ejection rod pushes the pipette tip off of the neck. The gear apparatus with a curved support can be configured as described in the parallel European patent application of today's date by the same applicant entitled "Pipette for use with a pipette tip" with application number EP 19 150 808.4. In this respect, reference is made to the above application, the content of which is hereby incorporated into this patent application.

According to another embodiment, the drive apparatus has a transmission mechanism that is configured to displace a drive element of the drive apparatus alternatingly downward and upward when the operating element is sequentially displaced downward, between which the operating element is displaced upward. This embodiment is advantageous with an operating element that is displaceable in the longitudinal direction of the neck in order to drive the drive apparatus. In the first downward displacement of the operating dement, the drive element is displaced downward out of an upper position into a lower position; in the subsequent upward displacement of the operating element, the drive element retains its lower position, and in the subsequent downward displacement of the operating element, the drive element is displaced back into the upper position. This sequence can be repeated as frequently as desired. According to another embodiment, the transmission mechanism is at least partially arranged within a curved support designed as a rotating sleeve. This enables space-saving accommodation.

According to another embodiment, the pipette housing and the gear apparatus have a magnet arrangement and/or a spring apparatus that is designed to independently displace the operating element into the start position. The magnet arrangement comprises for example two permanent magnets, or one permanent magnet and one ferromagnetic component. The permanent magnets, or respectively the ferromagnetic component, are held on the pipette housing and on the gear apparatus so that they independently displace the operating element into a start position when they approach each other. This can also be achieved by a spring apparatus that is pretensioned when the gear apparatus is displaced out of the start position and seeks to displace the gear apparatus back into the start position.

According to another embodiment, there is a sensing element Which is coaxial with the neck and is braced against the pipette housing via a spring and can be pretensioned by means of a pipette tip being pushed onto the neck so that, when a pipette tip is released from the neck, the spring relaxes, and the sensing element assists with pressing the pipette tip off of the neck. The sensing element can in particular be a sensing element of a sensing apparatus for sensing the collar of a pipette tip as described in EP 18 168 763.3. In this respect, reference is made to the above application, the content of which is hereby incorporated into this patent application.

According to another embodiment, the pipette tip is a single channel pipette or a multichannel pipette. With a multichannel pipette, the curved support can control the ejection rod of a multichannel ejector.

According to another embodiment, the first means for positively connecting the stroke rod to the tip plunger are a circumferential annular groove or an annular circumferential bead on the lower end of the stroke rod. According to another embodiment, the first means for positive connection are formed on the inner circumference of a receiving means on the lower end of the stroke rod or on the outer circumference of the stroke rod. According to another embodiment, the second means for positively connecting the tip plunger are configured to be complementary to the first means for positive connection with the tip plunger. According to another embodiment, the second means for positively connecting the tip plunger are a circumferential annular groove on the upper end at the tip plunger or an annular circumferential bead on the upper end of the tip plunger. According to another embodiment, the other means for positive connection are formed on the outer circumference of the tip plunger or on the inner circumference of a receiving means on the upper end of the tip plunger.

According to another embodiment, the first means for positively connecting the neck to a pipette tip are a circumferential annular groove on the outside of the neck or an annular circumferential bead on the outside of the neck. According to another embodiment, the second means far positively connecting the pipette tip to the first means are configured to be complementary to the first means. According to another embodiment, the second means for positively connecting the pipette tip to the first means are an annular circumferential bead on the inner circumference on the upper end of the pipette tip or a circumferential annular groove on the inner circumference.

The lower end of the stroke rod refers to a region at the bottom of the stroke rod that extends over a more or less long length of the stroke rod in the vertical direction. The upper end of the tip plunger refers to a region at the top of the tip plunger that extends over a more or less long length of the tip plunger in the vertical direction. The upper end of the pipette tip refers to a region at the top of the pipette tip that extends over a more or less long length of the pipette tip in the vertical direction.

BRIEF DESCRIPTION OF THE DRAWINGS

The invention is explained in greater detail below based on the attached drawings of an exemplary embodiment. In the drawings:

FIG. 14*c* illustrates a side view of an embodiment of the upper end of the plunger rod and lower end of the stroke rod of the positive displacement pipette after the locking sleeve has been pushed on;

DETAILED DESCRIPTION OF THE INVENTION

In the present application, the expressions "upper" and "lower" or "top" and "bottom" as well as "vertical" and "horizontal" and terms derived therefrom such as "above" and "below", "standing upright" and "upside down" as well as "one over the other" refer to an arrangement of the pipette in which the neck is oriented vertically, and is located on the downwardly facing end of the pipette housing. With regard to the pipette tip, these expressions refer to a vertical orientation of the central axis of the pipette tip, wherein the tip opening is arranged at the bottom and the mounting opening is arranged at the top.

An exemplary embodiment for securing a pipette tip to the neck of a pipette by means of a locking sleeve that borders the neck on the inside in the locked position will be explained based on FIGS. 1 to 10. An exemplary embodiment for securing a pipette tip to the neck of a pipette by means of a locking sleeve that borders the pipette tip on the outside will be explained based on FIG. 11. An exemplary embodiment for securing a tip plunger to a stroke rod by means of a locking sleeve that border the lower end of the stroke rod on the outside in the locked position will be explained based on FIGS. 12 to 14. In this exemplary embodiment, the pipette tip is also secured to the neck by means of the same locking sleeve in that same borders the neck on the inside. The explanations regarding the pipette from FIGS. 1 to 10 also apply to the pipette according to FIGS. 12 to 14.

Figure 1:
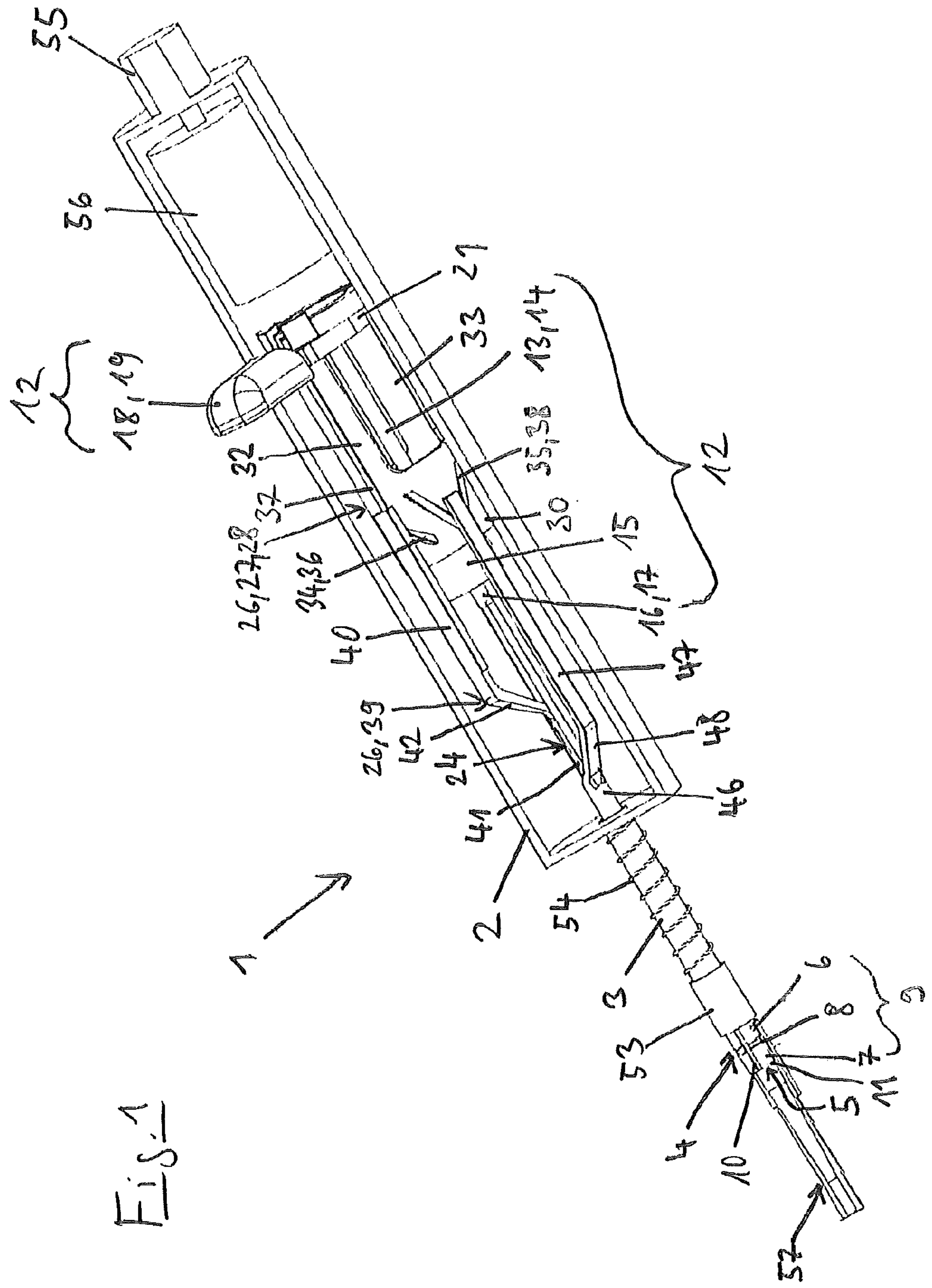
FIG. 1 illustrates a partial cut-away view of an embodiment of a positive displacement pipette with a pipette tip mounted on the neck.
Figure 2:
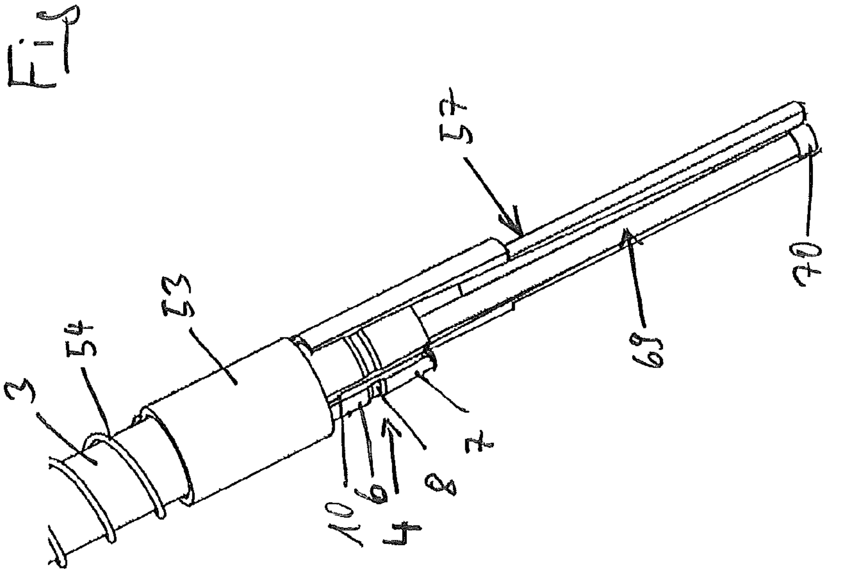
FIG. 2 illustrates an enlarged perspective view of the embodiment of the positive displacement pipette with a pipette tip mounted on the neck from FIG. 1 and further showing an embodiment of a slotted neck with an inner adjacent locking sleeve.
Figure 3:
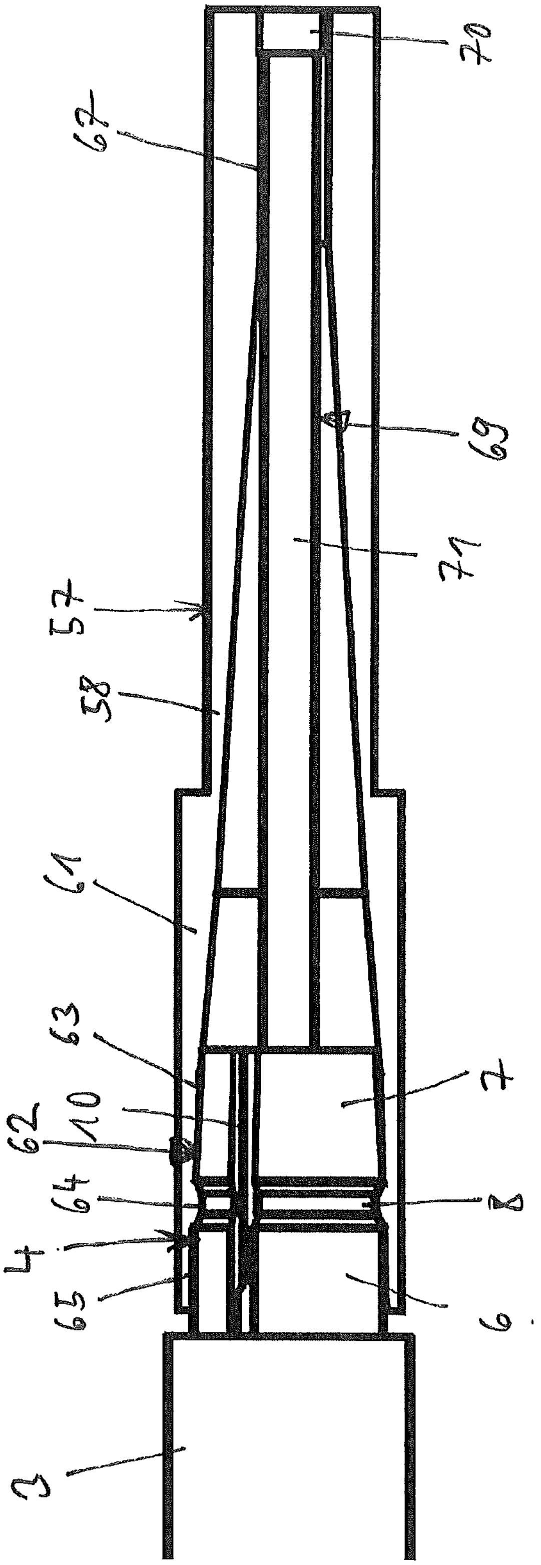
FIG. 3 illustrates a side view of the embodiment of the positive displacement pipette with a pipette tip mounted on the neck of FIG. 1.

According to FIG. 1, a pipette 1 configured as a positive displacement pipette has a rod-shaped (e.g. cylindrical) pipette housing A hollow cylindrical shaft 3 projects downward from the lower end of the pipette housing 2. A neck 4 projects downward from the lower end of the shall 3, which, according to FIGS. 1 and 4, has a through-bore 5 with a through-hole in the lower end. The inner diameter of the through-bore 5 is smaller than the inner diameter of the shaft 3.

The neck 4 has a top neck section 6 in the shape of a hollow cylinder, and underneath, a lower neck section 7 in the shape of a hollow cone. An annular groove 8 runs around the outer circumference of the neck 4 between the upper neck section 6 and the lower neck section 7. The upper neck section 6, the annular groove 8, and the lower neck section 7 form first means for positively connecting 9 the pipette to a pipette tip. Furthermore, the neck 4 comprises slots 10 running in the longitudinal direction thereof which are distributed evenly over the circumference. The slots 10 extend from the lower end 11 over the entire length of the neck 4.

Figure 5:
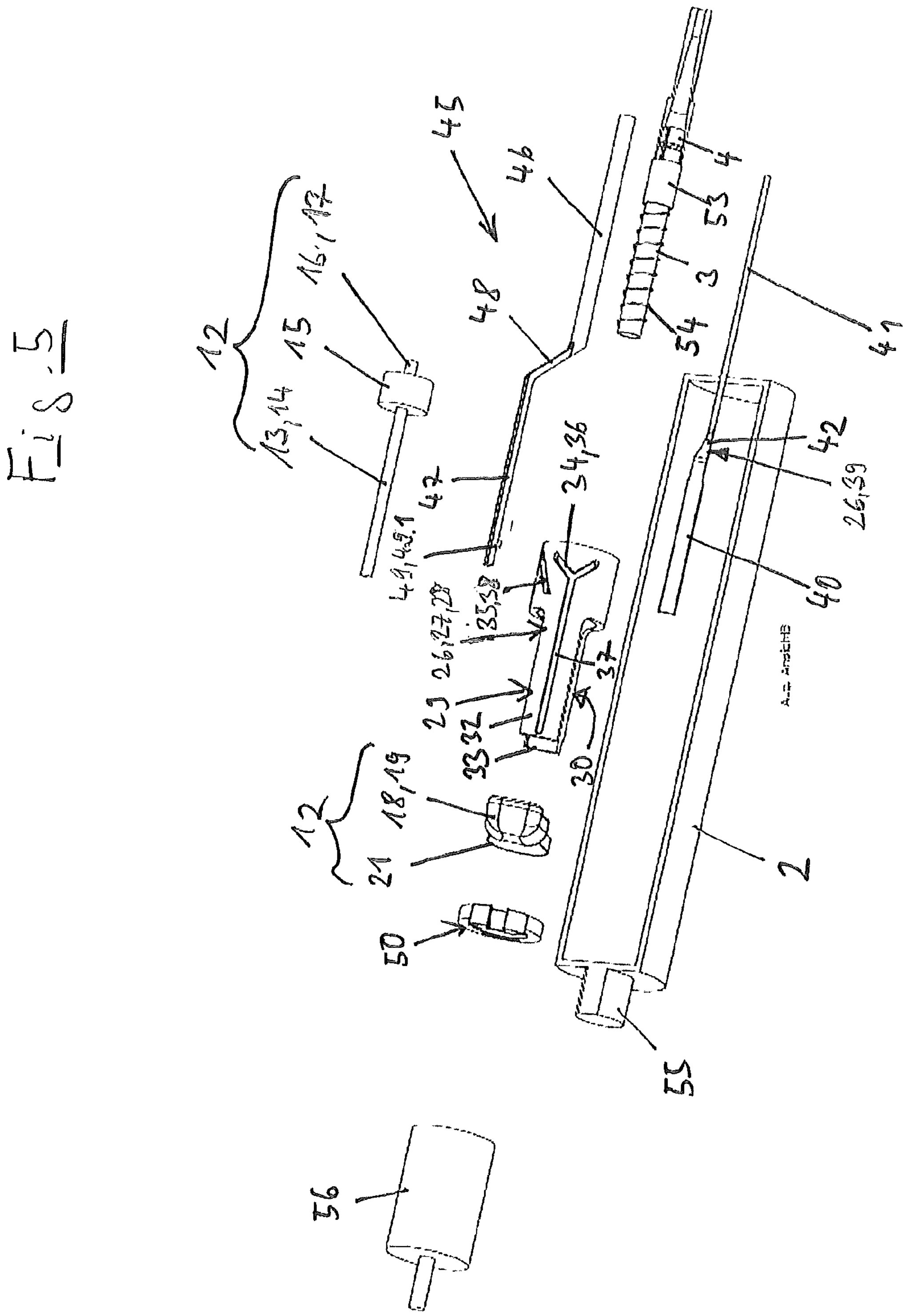
FIG. 5 illustrates an exploded view of the positive displacement pipette with a pipette tip mounted on the neck of FIG. 1.
Figure 6:
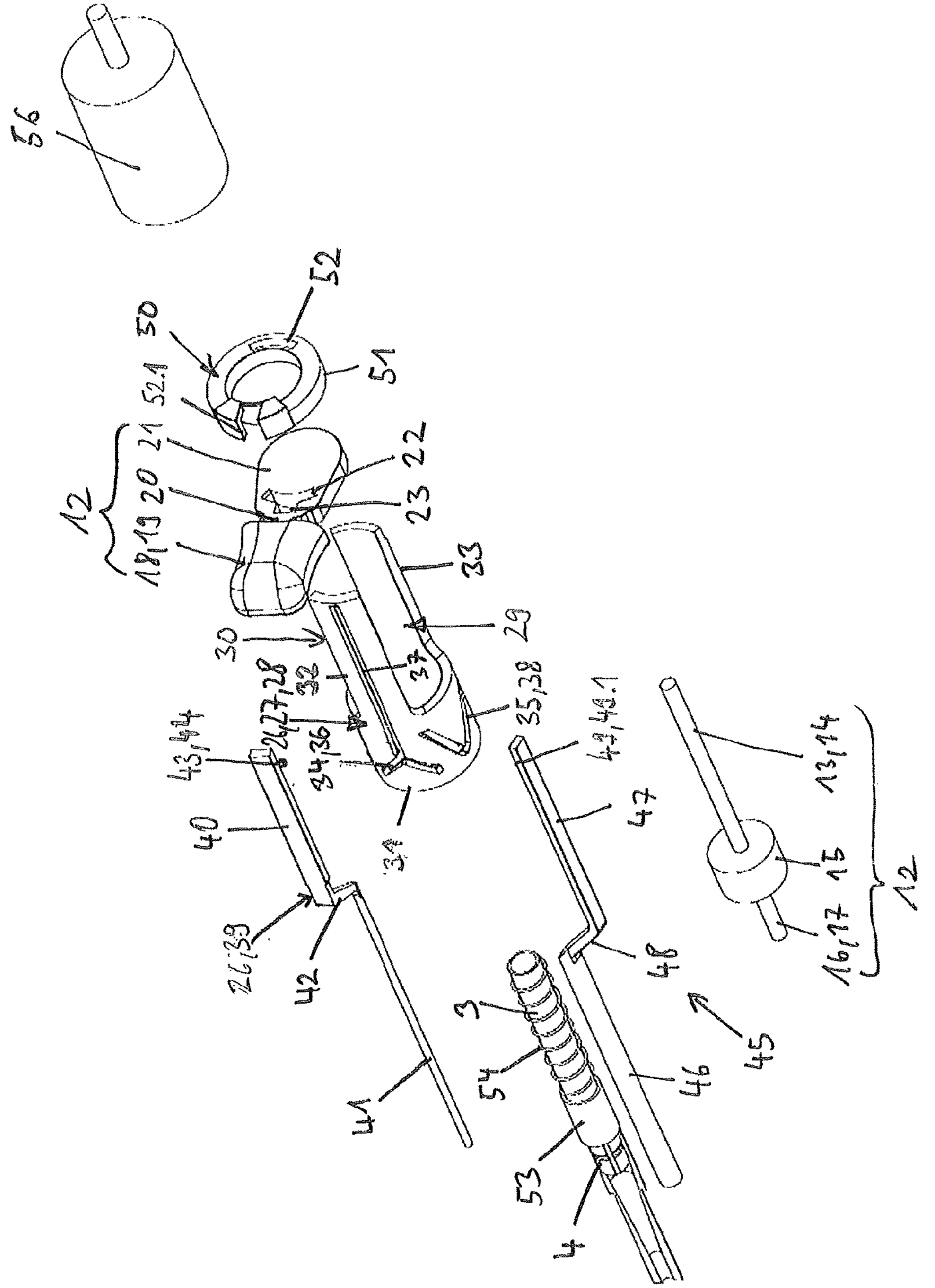
FIG. 6 illustrates an exploded view of the positive displacement pipette with a pipette tip mounted on the neck of FIG. 1 without the pipette housing.

According to FIGS. 1, 5 and 6, there is a drive apparatus 12 in the pipette housing 2 that comprises a transmission element 13 in the form of a transmission rod 14, a transmission mechanism 15 and a drive element 16 in the form of a stroke rod 17. Furthermore, the drive apparatus 12 comprises an operating element 18 in the form of an operating lever 19 that is securely connected via a bar 20 to a support plate 21.

According to FIG. 6, the support plate 21 has an oval shape with a wide, rounded end and a narrow rounded end, wherein the operating lever 19 projects from the edge of the narrow rounded end. In addition to this edge, the support plate 21 has a first curved slot 22 that runs approximately parallel to the contour of the narrow rounded end. Furthermore, the support plate 21 has a rectangular first edge cutout 23 in the center of the first curved slot 22 on the side of the narrow rounded end.

According to FIGS. 1 and 5, the stroke rod 17 is inserted from above into the shaft 3 and the neck 4. According to FIG. 4, it is hollow and provided with an axial bore that extends down to a hole in the lower end of the stroke rod. Furthermore, the stroke rod 17 comprises a longitudinal slot 24 that runs in the longitudinal direction proceeding from the lower end. Because of the longitudinal slot 24, the stroke rod 17 has a C-shaped cross-section. Its lower end forms a receiving means 25 for the upper end of a plunger rod.

The transmission mechanism 15 is configured so that the stroke rod 17 is alternatingly displaced downward and upward during sequential downward displacements of the operating lever 19 between which the operating lever 19 is displaced upward. Consequently, by pressing the operating lever 19 downward, the stroke rod 17 can be displaced out of an upper position into a lower position, the stroke rod 17 retains the lower position during the subsequent upward displacement of the operating lever 19, and the stroke rod 17 is again displaced upward by subsequently pressing the operating lever 19 downward. This can be repeated as frequently as desired.

According to FIGS. 1, 5, and 6, the pipette 1 is provided with an ejection apparatus 26. This comprises a curved support 27 that is rotatably mounted in the pipette housing 2 and is designed as a hollow cylindrical rotating sleeve 28. The rotating sleeve 28 is for example rotatably mounted by its outer circumference on the inner circumference of the pipette housing 2 and the upper and lower ends are braced against ledges of steps on the inner circumference of the pipette housing 2 so that it cannot be displaced in an axial direction in the pipette housing 2. The rotational axis of the rotating sleeve 28 coincides with the longitudinal axis of the pipette housing and the longitudinal axis of the neck 4.

The rotating sleeve 28 has parallel cutouts 29, 30 on two diametrically opposing sides parallel to its rotational axis which extend from the upper edge of the rotating sleeve 28 and terminate at a distance from its lower edge. Below the cutouts, the rotating sleeve 28 accordingly consists of an annular base 31, and it also consists of two diametrically opposing sectors 32, 33 of an annulus that border the two cutouts 29, 30 on the side.

A first curve 34 and a second curve 35 are arranged on the outer circumference of the annular base 31 of the rotating sleeve 28. The first curve 34 is configured as a first groove 36 in the form of an inverted (upside down) Y. The vertical part 37 of the Y extends far upward to a sector 32 just short of the upper edge of the sector 32. The second curve 35 is a second groove 38 in the outer circumference of the base 31 of the rotating sleeve 28 in the form of an upright V. The first curve 34 and the second curve 35 are arranged so as to be offset by, e.g., 80° relative to each other on the circumference of the rotating sleeve. The first curve 34 and the second curve 35 each extend over an angular range of less than 90° over the circumference of the rotating sleeve 28.

According to FIGS. 1, 5 and 6, the ejection apparatus 26 comprises an ejection rod 39 that comprises a strip-shaped upper ejection rod part 40 and a cylindrical lower ejection rod part 41. An accordingly curved, continuous wire may be used instead of the ejection rod 39. The upper and the lower ejection rod part 40, 41 are parallel to each other and arranged so as to be laterally offset relative to each other. The lower end of the upper ejection rod part 40 is connected to the upper end of the lower ejection rod part 41 by a strip-shaped connecting rod part 42 angled obliquely relative to the two ejection rod parts. A first sensing element 43 in the form of a first guide pin 44 projects at a right angle from the inside of the upper ejection rod part 40. The ejection rod 39 is preferably designed as a single part, for example from a rigid plastic.

Figure 4:
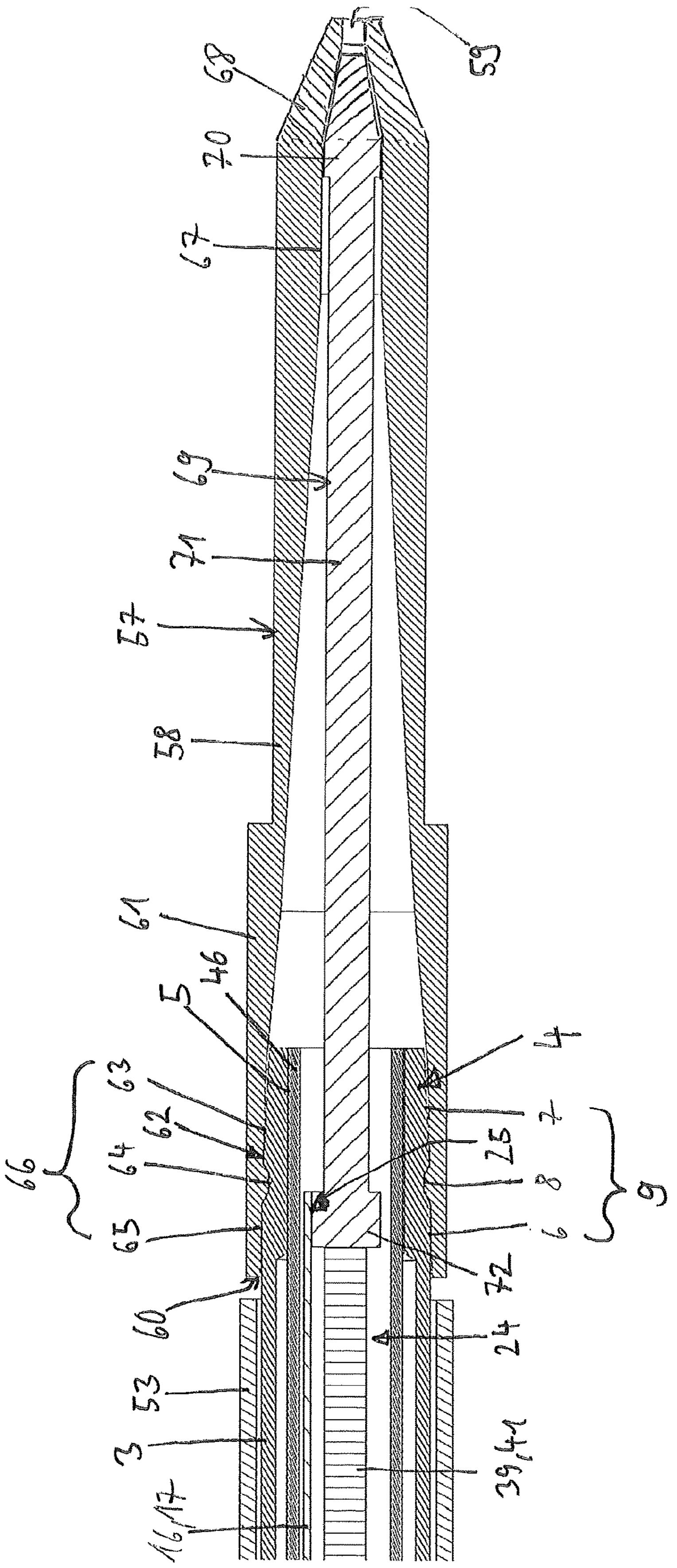
FIG. 4 illustrates a longitudinal view of the embodiment of the positive displacement pipette with a pipette tip mounted on the neck of FIG. 1.
Figure 7:
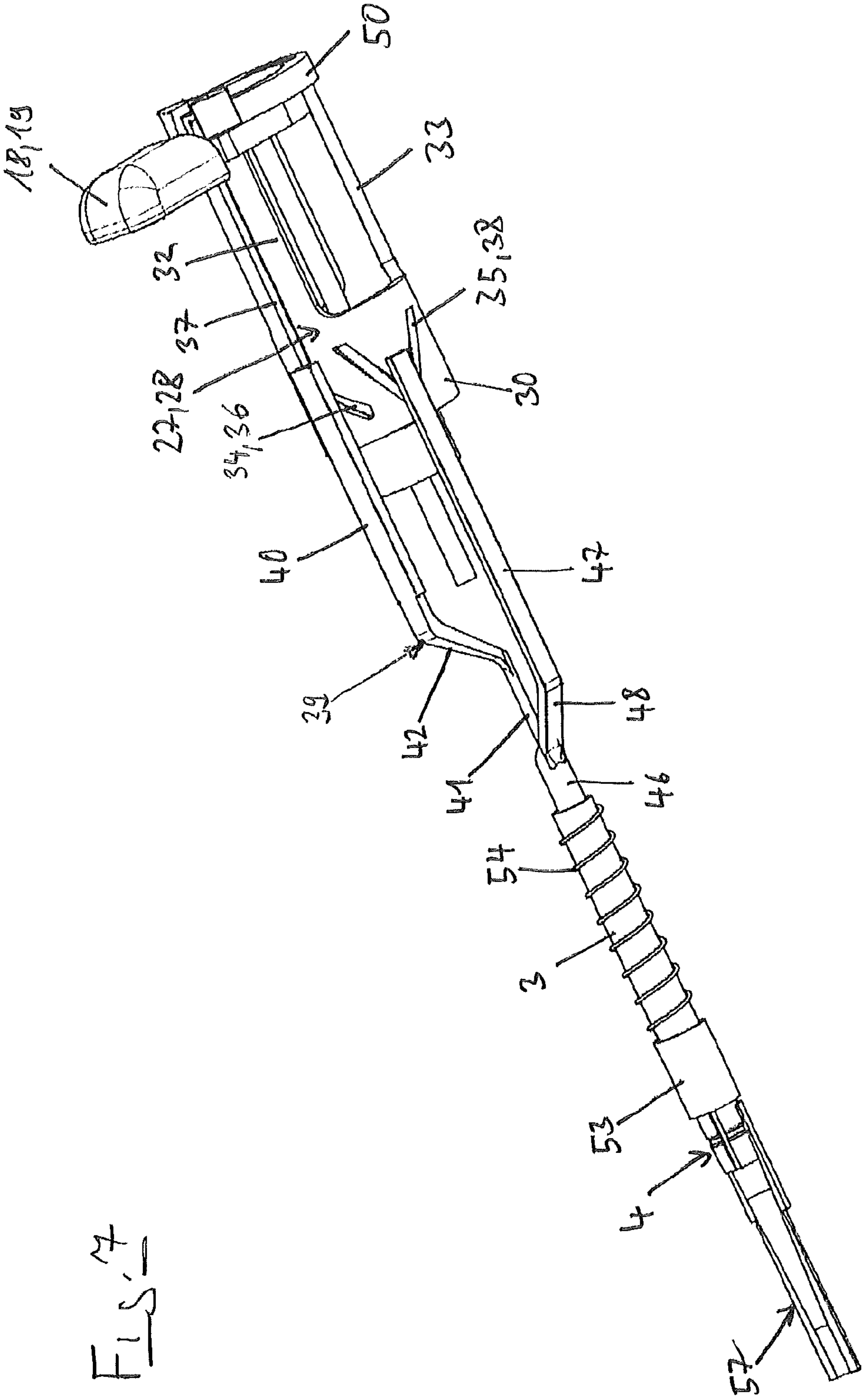
FIG. 7 illustrates a perspective view of an embodiment of a rotating sleeve with the ejection rod and the locking sleeve of the embodiment of the positive displacement pipette with a pipette tip mounted on the neck of FIG. 1 in the start position.

According to FIGS. 1, 4 and 7, the ejection rod 39 is guided by the guide pin 44 in the first groove 36, the connecting rod part 42 penetrates the longitudinal slot 24 of the stroke rod 17, and the lower ejection rod part 41 extends within the stroke rod 17 almost up to the lower end thereof.

According to FIGS. 1, 4, 5 and 6, the pipette 1 comprises a locking apparatus 45 that comprises a locking sleeve 46 and a strip-shaped control rod 47 parallel thereto. The upper end of the locking sleeve 46 and the lower end of the control rod 47 are connected to each other by a second connecting rod part 48 that is angled obliquely to the locking sleeve 46 and to the control rod 47. A second sensing element 49 in the form of a second guide pin 49.1 projects from the inside of the control rod 47.

According to FIGS. 1 and 7, the second guide pin 49.1 is guided in the second groove 38. According to FIGS. 1 and 4, the locking sleeve 46 is inserted from above into the shaft 3 and lies against the inner side of the neck 4. The stroke rod 17 and the ejection rod 39 are inserted from above into the locking sleeve 46.

With the first curved slot 22, the operating element 18 is pushed onto the sector 32 of the rotating sleeve 28 on which the first groove 36 extends. According to FIG. 1, 6 and 7, the rotating sleeve 28 is connected at the top to a support ring 50 that bridges the two sectors 32, 33 and stabilizes the rotating sleeve 28. On the outer edge, the support ring 50 has a downwardly projecting lateral surface 51 that laterally surrounds the outer edges of the two sectors 32, 33. Furthermore, it has a second curved slot 52 that accommodates the upper edge of the sector 33, which is not provided with a groove 36, 38. On the diametrically opposite side, there is a rectangular second edge cutout 52.1 in the lateral surface 51 that is open at the bottom and is designed to accommodate the bar 20 between the operating lever 19 and support plate 21.

The support ring 50 is for example connected to the rotating sleeve 28 by adhesion.

The rotating sleeve 28 and the locking sleeve 46 as well as the operating element 18 are for example made of one or more rigid plastics and/or metal. The rotating sleeve 28, the support ring 50, the operating element 18 and/or the locking sleeve 46 are preferably each designed as a single part. An operating button of the operating element 18 can also be produced from an elastic or soft elastic plastic or rubber.

So that it can be operated from the outside, the operating lever 19 extends out of the pipette housing 2 through a first housing slot running transverse to the longitudinal axis of the pipette housing 2 and extending over a part of the circumference of the pipette housing 2. The first housing slot is connected in the middle to a second housing slot running in the longitudinal direction of the pipette housing 2.

The operating lever 19 can be displaced downward counter to the effect of a spring apparatus, starting from the support ring 50, along the second housing slot, wherein it slides with the first curved slot 22 on the sector 32 of the rotating sleeve 28. After being relieved, the spring apparatus independently displaces the operating lever 19 back upward.

A sleeve-shaped third sensing element 53 is guided on the outside of the shaft 3. A spring apparatus in the form of a helical spring 54 guided on the shall abuts the bottom side of the pipette housing 2 and the top side of the third sensing element 53. By means of the helical spring 54, the third sensing element 53 is pressed from above against a stop element on the shaft 3 or the neck 4.

An adjusting knob 55 for adjusting a metering volume is arranged on the top side of the pipette housing 2. The metering volume can be adjusted by turning the adjusting knob 55. A counter 56 arranged thereunder in the pipette housing 2 indicates the respectively set metering volume. The adjusting knob 55 and/or the counter 56 is coupled to the transmission mechanism 15. The transmission mechanism 15 is designed to change the stroke of the stroke rod 17 according to the respectively set metering volume, which stroke is performed by means of the downward displacement of the operating element 18.

According to FIGS. 1 and 4, a pipette tip 57 is mourned on the neck 4. The pipette tip 57 comprises a tubular body 58 that has a tip opening 59 in the lower end, a collar 61 having a mounting opening 60 on the upper end, and a seat region 62 on the inner circumference of the collar 61 for clamping onto the neck 4. The seat region 62 has a contour complementary to the neck 4 that has a conical lower seat section 63 at the bottom for accommodating the conical lower neck section 7, above which is a circumferential bead 64 for engaging in the annular groove 8 of the neck 4, and above which is a cylindrical upper seat section 65 for accommodating the cylindrical upper neck section 6. The lower seat section 63, the head 64, and the upper seat section 65 form second means for positively connecting 66 the pipette tip 57 to the pipette 1.

Below the seat region 62, the tubular body 58 has a cylindrical plunger travel region 67. Thereunder, the tubular body 58 has a downwardly tapering tip section 68 with the shape of a hollow conical frustum. The tip section 68 is shown in FIG. 4 and is omitted in the other drawings for reasons of simplification. A tip plunger 69 is inserted into the tubular body 58. This comprises a plunger 70 that is guided in the plunger travel region 67. A plunger rod 71 projects upward from the plunger 70 and has a smaller diameter than the plunger 70. At the upper end, the plunger rod 71 has a plunger head 72. According to FIG. 4, the plunger head 72 is pressed downward into the receiving means 25 of the stroke rod 17.

One method for using the pipette 1 will now be discussed. According to FIGS. 1 and 8, a pipette tip 57 is held on the pipette 1 in a pipetting position. The seat region 62 is positively connected to the neck 4 in particular by means of the bead 64 engaging in the annular groove 8. The operating element 18 is located in the pipetting position at the upper end of the second housing slot and can be screwed into the first housing slot in both directions. The maximum angle of rotation is limited by the extent of the first and second grooves 36, 38 in the circumferential direction or the first housing slot depending on which extent is smaller.

The locking sleeve 46 is arranged in the lowest position according to FIG. 4 so that it prevents the pipette tip 57 from unintentionally releasing from the neck 4. For the positive connection to be released, a radial constriction of the neck 4 that the locking sleeve 46 does not permit in this position would in fact be necessary. The tip plunger 69 is securely clamped to the plunger head 72 in the receiving means 25 of the stroke rod 17.

Figures 8, 9, 10:
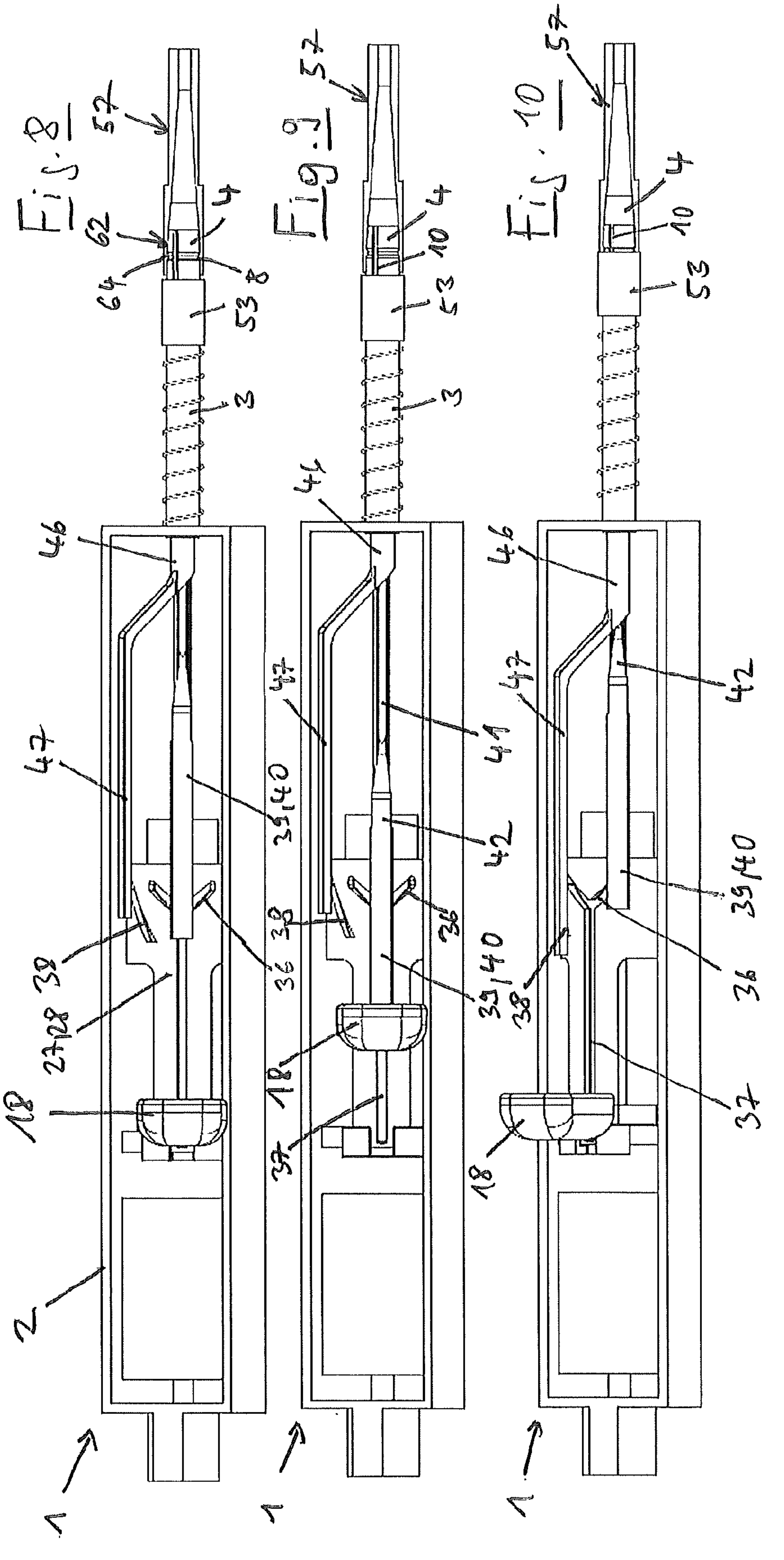
FIG. 8 illustrates a partial cut-away side view of the embodiment of the positive displacement pipette with a pipette tip mounted on the neck of FIG. 1.
FIG. 9 illustrates a partial cut-away side view of the embodiment of the positive displacement pipette with a pipette tip mounted on the neck of FIG. 1 while pipetting.
FIG. 10 illustrates a partial cut-away side view of the embodiment of positive displacement pipette with a pipette tip mounted on the neck of FIG. 1 while ejecting.

To draw liquid, the pipette 1 is immersed in a liquid by the lower end of the pipette tip 57 held thereon. Then the operating element 18 is pressed downward. This movement is converted by the transmission apparatus 15 into a stroke movement of the stroke rod 17. As a result, the tip plunger 69 is displaced upward. In so doing, the plunger head 72 entrains the ejection rod 39 so that the first guide pin 44 slides upward in the vertical part 37 of the Y-shaped first groove 36. During this, the locking sleeve 46 retains its position. This is shown in FIG. 9.

Once the operating element 18 has performed the set stroke, the pipette tip 57 is filled with a certain amount of liquid. Then the operating element 18 is relieved and is displaced back upwards by the spring apparatus up to the stop on the support ring 50. To discharge this amount of liquid, the pipette tip 57 of the pipette 1 can be oriented over another vessel. By again pressing the operating element 18 downward, the stroke rod 17 is displaced downward and the quantity of liquid is discharged. In so doing, the first guide pin 44 slides downward to the node of the first groove 36.

When liquid is being drawn up, an operating stroke that depends on the set quantity of liquid is performed by the operating element 18. The operating stroke for dispensing the liquid is always the full operating path, regardless of the set quantity of liquid. Liquid can be drawn and discharged several times.

To eject the pipette tip 57, the operating lever 18 is swung to the right or to the left proceeding from the pipetting position. This rotates the rotating sleeve 28 so that the second groove 38 displaces the second guide pin 49.1, and therefore the locking sleeve 46, upward until the locking sleeve 46 has released the neck 4 until it can be deformed radially inward. In the exemplary embodiment in FIGS. 12 to 14, in the process, the lower end of the stroke rod 17 is additionally released from the locking sleeve 46 until it can be deformed radially outward. To accomplish this, preferably the locking sleeve 46 is pulled out of the through-bore 5. Furthermore, by rotating the rotating sleeve 28, the first guide pin 44 is displaced downward in one of the two lateral sections of the bottom part of the first groove 36 so that the ejection rod 39 presses against the tip plunger 69, which abuts the tip section 68 at the bottom. In so doing, the bead 64 exerts a radial force on the neck to constrict it, and the positive connection between pipette tip 57 and neck 4 is released. This releases the pipette tip 57 from the neck 4. This is shown in FIG. 10. In the exemplary embodiment in FIGS. 12 to 14, in the process, the annular groove 77 or the thickening 75 exerts a radial force on the stroke rod 17 so that same expands and the positive connection between the tip plunger 69 and stroke rod 17 is released. The scraping of the pipette tip 57 off the neck 4 can be assisted by the sensing element 53, which is pressed by the pretensioned helical spring 54 against the top edge of the pipette tip 57.

Once the used pipette tip 57 is released from the neck 4, a new pipette tip 57 can be connected to the neck 4. To accomplish this, the pipette 1 can be inserted with the neck 4 into the drawing opening 68 of a pipette tip 57 provided in a support. In so doing, the sensing element 53 is displaced upward and pretensions the helical spring 54. Furthermore, the plunger head 72 presses against the bottom side of the ejection rod 39 so that the first guide pin 44 slides up to the first branching point of the first groove 36. In so doing, the rotating sleeve 28 is rotated in the pipette housing 2 until the operating element 18 is located in the pipetting position. At the same time, the second guide pin 49.1 slides in the second groove 38 to the low point. This displaces the locking sleeve 46 into the locked position in FIG. 4, in which it prevents the pipette tip 57 from becoming released from the neck 4. In the exemplary embodiment in FIGS. 12 to 14, the locking sleeve 46 in the locked position also prevents the tip plunger 69 from becoming released from the stroke rod 17. The connection of the tip plunger 69 to the stroke rod 17 and the pipetting can be carried out in the above-described manner.

Figure 11:
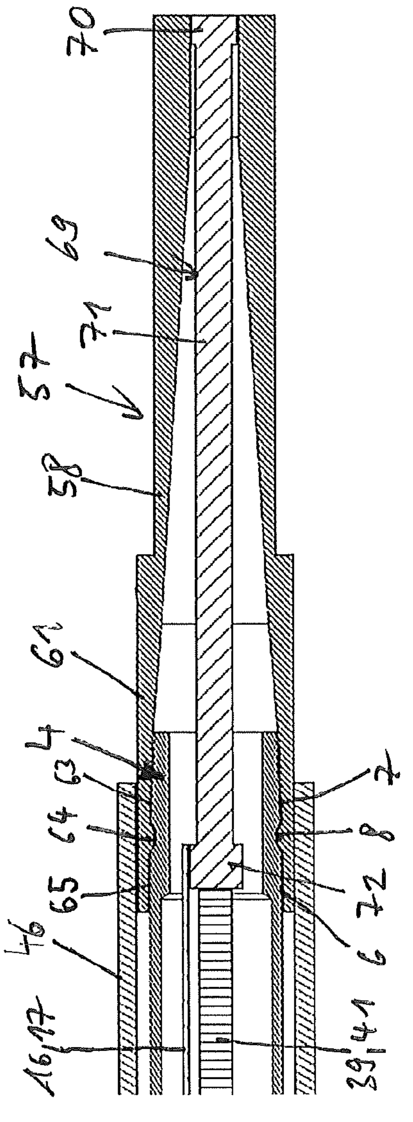
FIG. 11 illustrates a longitudinal sectional view or an embodiment of a slotted pipette tip on a neck of another embodiment of a positive displacement pipette with a locking sleeve lying on the outside of the pipette tip.
Figure 12A:
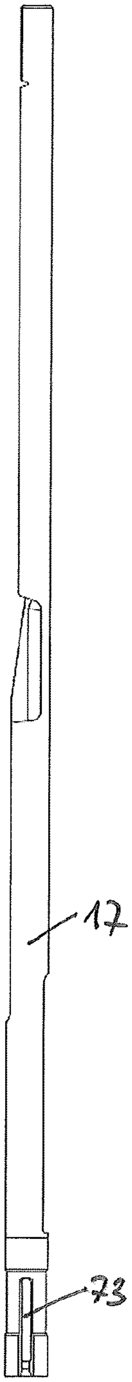
FIG. 12*a* illustrates a side view of an embodiment of a stroke rod of the positive displacement pipette.
Figure 12B:
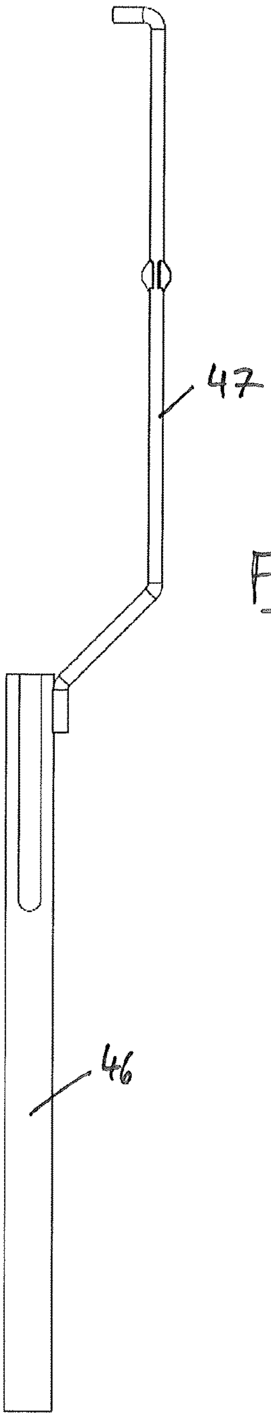
FIG. 12*b* illustrates a side view of an embodiment of a locking sleeve of the positive displacement pipette.
Figure 12C:
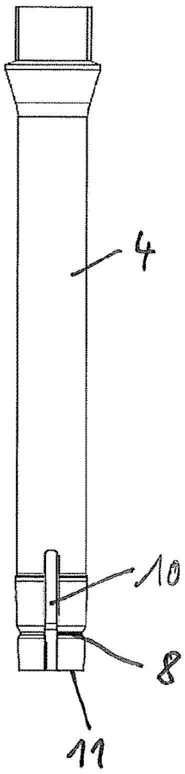
FIG. 12*c* illustrates a side view of an embodiment of a neck of the positive displacement pipette.
Figure 12D:
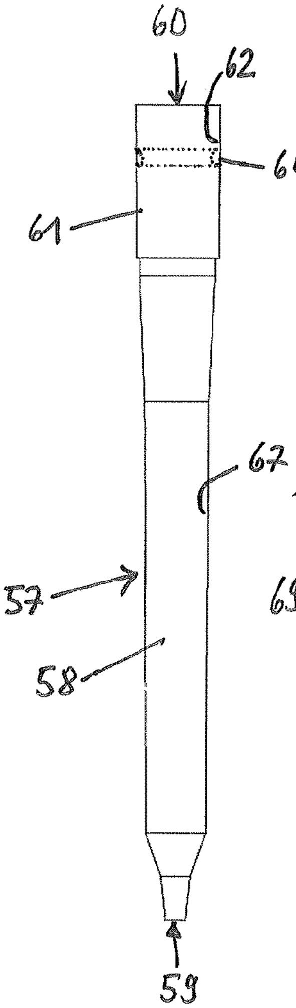
FIG. 12*d* illustrates a side of an embodiment of a pipette tip of the positive displacement pipette.
Figure 12E:
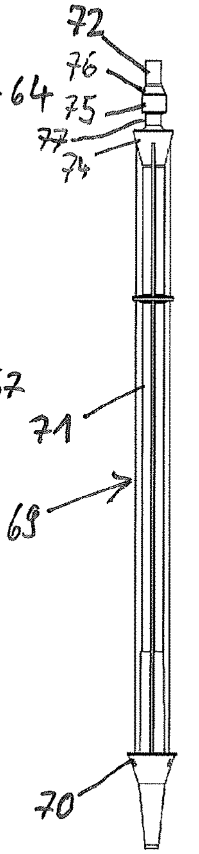
FIG. 12*e* illustrates a side view of an embodiment of a tip plunger of the positive displacement pipette.

The exemplary embodiment in FIG. 11 differs from that described above in that the locking sleeve 46 is pushed in the locked position beyond the outer circumference of the collar 61 of the pipette tip 57. This positive displacement pipette uses pipette tips 57 that have at least one longitudinal slot that proceeds from the upper end. The longitudinal slot enables a radial expansion of the pipette tip 57 in order to establish a positive connection between the pipette tip 57 and the neck 4. The positive connection is prevented from becoming released when the locking sleeve 46 is located in the locked position as shown in FIG. 11. To release the pipette tip 57 from the neck 4, the locking sleeve 46 is displaced upward by means of the rotating sleeve 28 as in the above-described exemplary embodiment, and then the pipette tip 57 is released from the neck 4 by pressing against the top side of the tip plunger 69.

According to FIG. 12*a* to *e*, a pipette 1 comprises a neck 4 with slots 10 proceeding from the lower end, a stroke rod 17 with additional slots 73 proceeding from the lower end, and a locking sleeve 46 with a control rod 47 at the upper end. The neck 4 comprises a circumferential annular groove 8 in the region of the slots 10.

In FIG. 12, a fitting pipette tip 57 and a fitting tip plunger 69 are also shown. The pipette tip 57 comprises a tubular body 58 with a tip opening 59 at the lower end and a mounting opening 60 at the upper end. The pipette tip 57 has a collar 61 with a seat region 62 on the inner circumference in which an inwardly projecting bead 64 circumferentially extends.

Below the collar, the pipette tip 57 has a plunger travel region 67 on the inside. A tip plunger 69 is inserted into the tubular body 58 through the mounting opening 60. This comprises a plunger 70 that is guided in the plunger travel region 67.

A plunger rod 71 projects upward from the plunger 70 and has a smaller diameter than the plunger 70. At the upper end, the plunger rod 71 has a plunger head 72.

Below the plunger head 72, the plunger 70 has a downwardly tapering cone 74, by means of which the tip plunger 69 is centered at the upper end of the plunger travel region 67 when said tip plunger is inserted as far as possible into the body 58.

Above the cone 74, the plunger head 72 has a cylindrical thickening 75 with a run-on slope 76 on the upper end. Another annular groove 77 extends circumferentially below the thickening 75.

Figure 13A:
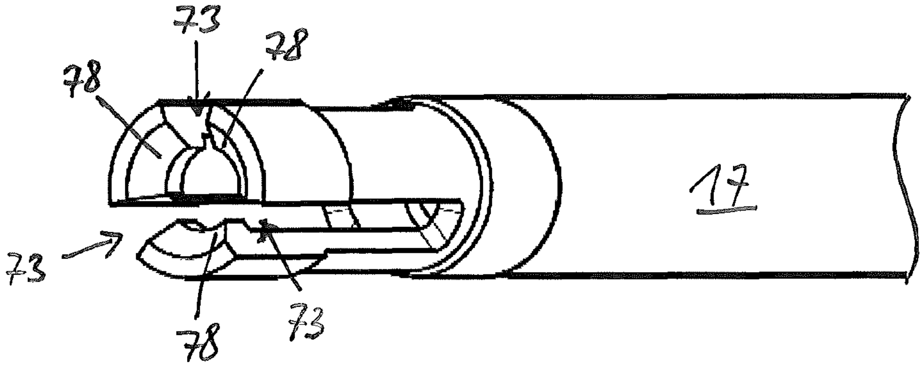
FIG. 13*a* illustrates a perspective side view of an embodiment of the lower end of the stroke rod of the positive displacement pipette.

In FIG. 13*a*, the lower end of the stroke rod 17 with the three slots 73 is shown in an enlarged view.

The segments of the stroke rod 17 formed between the slots 73 have an inwardly projecting hook 78 at the bottom which is shaped and dimensioned so as to snap into the annular groove 77 on the plunger head 72.

Figure 13B:
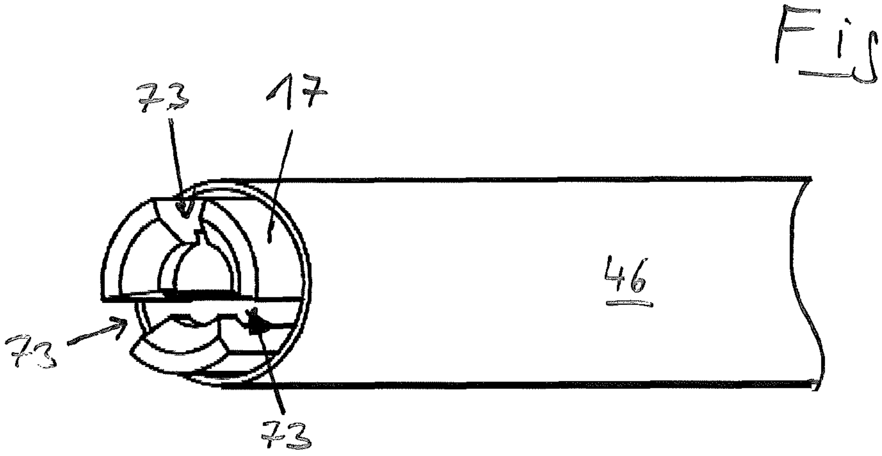
FIG. 13*b* illustrates a perspective side view of an embodiment of the stroke rod inserted in the locking sleeve of the positive displacement pipette.

According to FIG. 13*b*, the locking sleeve 46 is pushed onto the stroke rod 17 past the start of the slots 73.

Figure 13C:
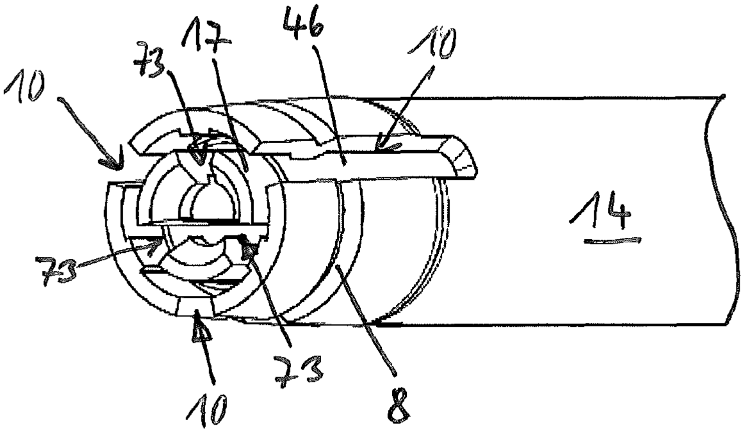
FIG. 13*c* illustrates a perspective side view of an embodiment of the stroke rod and locking sleeve inserted in the neck of the positive displacement pipette.

According to FIG. 13*c*, this arrangement is inserted into the neck 4. The stroke rod 17, the locking sleeve 46 and the neck 4 are shaped and dimensioned so that, in the locked position of the locking sleeve 46 shown in FIG. 13*c*, the stroke rod 17 cannot be elastically expanded any further in the region of the slot 73 and the neck 4 cannot be elastically compressed any further in the region of the slots 10. When the hooks 78 engage in the annular groove 77 of the tip plunger 69, the locking sleeve 46 thus prevents release of a tip plunger 69 from the stroke rod 17.

A pipette tip held in the annular groove 8 of the neck 4 on a bead 64 on the inner circumference of the body 58 is prevented from becoming released by means of the locking sleeve 46.

FIG. 14 shows the upper end of the tip plunger 69 and the lower end of the stroke rod 17 before being joined. In order to he joined, the plunger head 72 is inserted into the opening in the lower end of the stroke rod 17, wherein the lower end of the stroke rod 17 is gradually expanded when the hooks 78 slide over the run-on slope 76. The elastic expansion of the locking sleeve 46 is facilitated by means of the slots 73. Finally, the hooks 78 slide over the thickening 75 and snap into the other annular groove 77. This is shown in FIG. 14*b*.

Figure 14A:
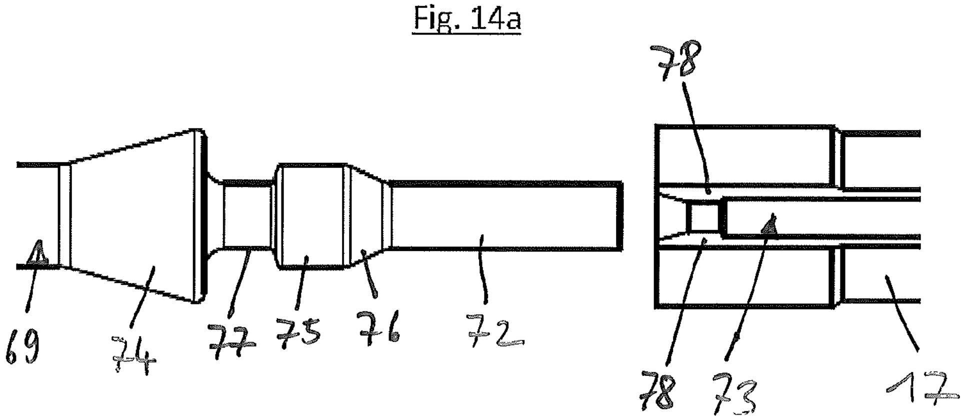
FIG. 14*a* illustrates a side view of an embodiment of the upper end of the plunger rod and lower end of the stroke rod of the positive displacement pipette prior to positive connection.
Figure 14B:
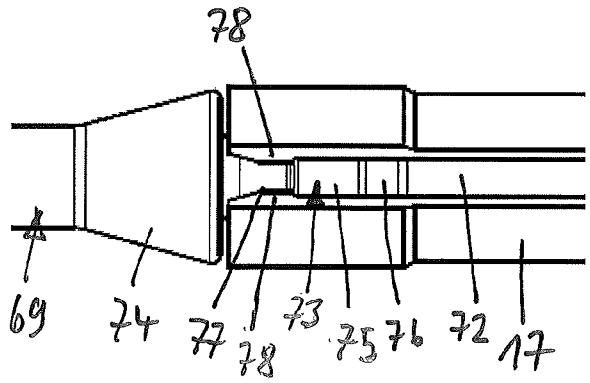
FIG. 14*b* illustrates a side view of an embodiment of the upper end of the plunger rod and lower end of the stroke rod of the positive displacement pipette after positive connection.
Figure 14C:
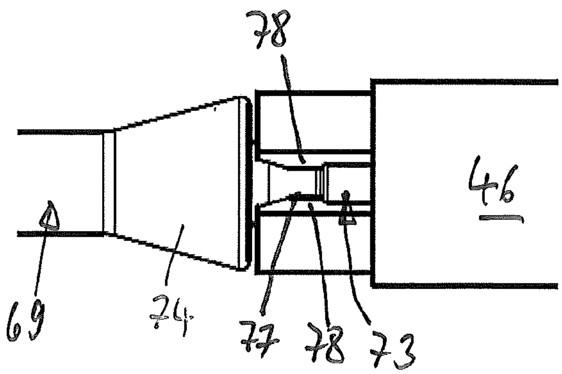

According to FIG. 14*c*, the tip plunger 69 is secured on the stroke rod 17 by means of the locking sleeve 46 being pushed over the lower end with the slots 73, since the locking sleeve 46 prevents elastic expansion of the lower end.

Figure 14D:
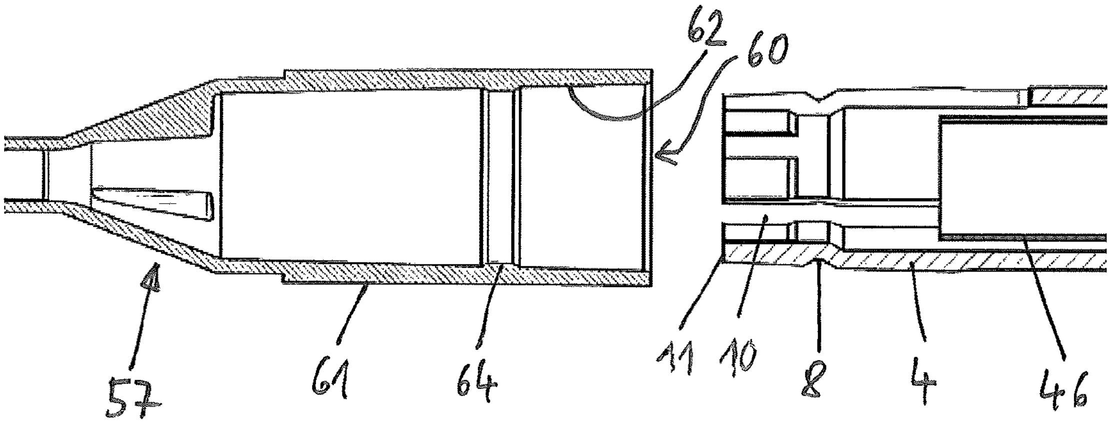
FIG. 14*d* illustrates a side view of an embodiment of the pipette tip of the positive displacement pipette prior to positive connection with the neck.
Figure 14E:
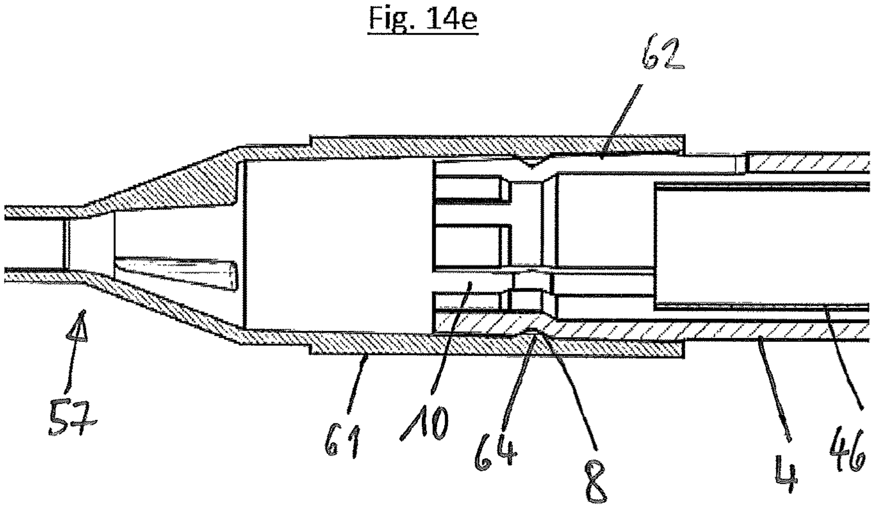
FIG. 14*e* illustrates a side view of an embodiment of the pipette tip of the positive displacement pipette alter positive connection with the neck.

According to FIG. 14*d*, the pipette tip 57 is mounted by the mounting opening 60 on the cone 4 until the bead 64 snaps into the annular groove 8 of the neck 4. This is shown in FIG. 14*e*.

Figure 14F:
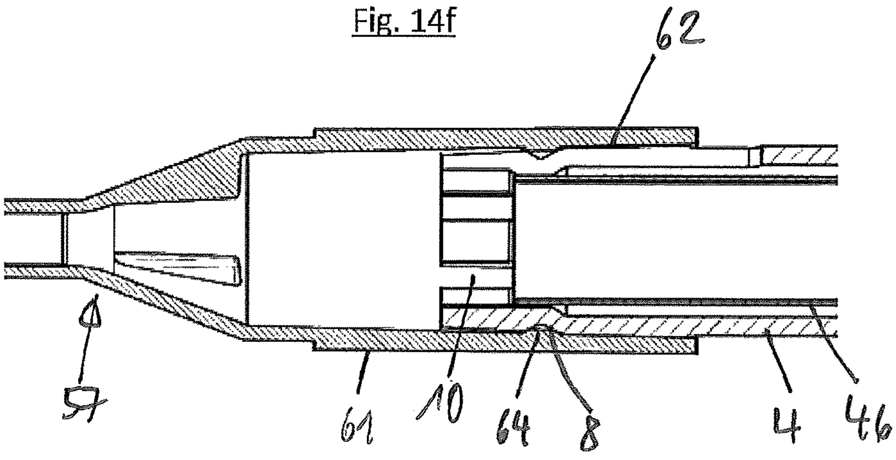
FIG. 14*f* illustrates a side view of an embodiment of the pipette tip of the positive displacement pipette with the locking sleeve in the locked position.

According to FIG. 14*f*, the positive connection between the pipette tip 57 and the neck 4 is secured by means of the locking sleeve 46, which is pushed into the region of the slots 10, 11. At the same time, the locking sleeve 46 secures the positive connection between the plunger rod 71 and the stroke rod 17.

A pipette provided with the components according to FIGS. 12 to 14 can be operated in the same manner as the pipette according to FIGS. 1 to 10.

LIST OF REFERENCE SIGNS

1. Pipette
2. Pipette housing
3. Shaft
4. Neck
5. Through-bore
6. Upper neck section

7. Lower neck section.
8. Annular groove
9. First positive connections means
10. Slot
11. Lower end
12. Drive direction
13. Transmission element
14. Transmission rod
15. Transmission mechanism
16. Drive element
17. Stroke rod
18. Operating element
19. Operating lever
20. Bar
21. Support plate
22. First curved slot
23. First edge cutout
24. Longitudinal slot
25. Receiving means
26. Ejection apparatus
27. Curved support
28. Rotating sleeve
29. Cutout
30. Cutout
31. Base
32. Sector
33. Sector
34. First curve
35. Second curve
36. First groove
37. Vertical part
38. Second groove
39. Ejection rod
40. Upper ejection rod part
41. Lower ejection rod part
42. Connecting rod part
43. First sensing element
44. Guide pin
45. Locking apparatus
46. Locking sleeve
47. Control rod
48. Second connecting rod part
49. Second sensing element
49.1 Second guide pin
50. Support ring
51. Lateral surface
52. Second curved slot
52.1 Second edge cutout
53. Third sensing element
54. Helical spring
55. Adjusting knob
56. Counter
57. Pipette tip
58. Body
59. Tip opening
60. Mounting opening
61. Collar
62. Seat region
63. Lower seat section
64. Bead
65. Upper seat section
66. Second positive connection means
67. Plunger travel region
68. Tip section
69. Tip plunger
70. Plunger
71. Plunger rod
72. Plunger head
73. Slot
74. Cone
75. Thickening
76. Run-on slope
77. Annular groove
78. Hook

The invention claimed is:

1. A pipette for use with a pipette tip with an integrated tip plunger, the pipette comprising:

a pipette housing extending from a lower end to an upper end;

a neck extending from the lower end of the pipette housing and configured to hold a pipette tip;

a stroke rod comprising an upper end and a lower end and configured to displace a tip plunger in the pipette tip, wherein the stroke rod comprises a receiving means positioned at the lower end of the stroke rod and configured to one of: (i) receive an upper end of the tip plunger of the pipette tip that is held on the neck; (ii) or be inserted into the upper end of the tip plunger, the stroke rod further comprises a first means for positive connection positioned on the lower end of the stroke rod, the tip plunger includes an upper tip plunger end and a lower tip plunger end, the tip plunger comprises a second means for positive connection positioned on the upper tip plunger end, a drive apparatus configured to displace the stroke rod to: (1) aspirate a liquid specimen into the pipette tip held on the neck; and (2) to eject the specimen from the pipette tip by means of a tip plunger positively connected to the stroke rod; and at least one locking sleeve arranged coaxially with the stroke rod and configured to be displaceably guided toward the stroke rod in the pipette housing, wherein the at least one locking sleeve is configured to be moved into a locked position in which the at least one locking sleeve borders, on an outside, one of: (1) a lower end of the stroke rod when the stroke rod is positively connected to the tip plunger; and (2) an upper end of the tip plunger when the stroke rod is positively connected to the tip plunger, wherein the first means for positive connection is configured to positively connect the stroke rod to the second means for positive connection of the tip plunger, wherein, prior to positive connection between the first means for positive connection and the second means for positive connection, one of: (i) the lower end of the stroke rod is configured to be elastically expanded when the tip plunger is inserted into the receiving means of the stroke rod; (ii) or the stroke rod is configured to be inserted into the receiving means of the tip plunger by the upper end of the tip plunger elastically expanding, wherein, when the first means for positive connection and the second means for positive connection have entered the positive connection, the elastic expansion of one of: (i) the lower end of the stroke rod; and (ii) the upper end of the tip plunger is at least partly reversed, wherein in the locked position, the locking sleeve is configured to inhibit release of a tip plunger from the stroke rod positively connected to the tip plunger, wherein the locking sleeve is configured to be displaced upward out of the locked position so that one of: (1) the lower end of the stroke rod is at least partially released and can be elastically expanded; and (2) the upper end of the tip plunger is at least partially released and can be elastically expanded and the tip plunger is configured to be detached from the stroke rod, wherein the first means for positively connecting the stroke rod to the tip plunger comprises one of: (1) a circumferential annular groove on the lower end of the stroke rod; and (2) an annular circumferential bead on the lower end of the stroke rod, and wherein the second means for positively connecting the tip plunger comprises a circumferential annular groove on the upper end of the tip plunger when the first means for positively connecting the tip plunger comprises the annular circumferential bead, and wherein the second means for positively connecting the tip plunger comprises an annular circumferential bead on the upper end of the tip plunger when the first means for positively connecting the tip plunger comprises the annular groove.

2. The pipette according to claim 1, wherein the stroke rod defines at least one slot running in a longitudinal direction, and wherein when the locking sleeve is in the locked position, the locking sleeve borders the stroke rod on an outside in at least one of a region proximate to the at least one slot.

3. The pipette according to claim 2, wherein when the stroke rod is in the locked position, the stroke rod is configured to border the tip plunger in a region proximate to the at least one slot.

4. The pipette according to claim 1, wherein the locking sleeve is connected to an operating element that projects from the pipette housing, and wherein the operating element is configured to be displaced relative to the pipette housing in order to displace the locking sleeve downward into the locked position and upward out of the locked position.

5. The pipette according to claim 1, further comprising an ejection apparatus comprising:

an ejection rod with an upper end and a lower end and configured to be guided inside an axial bore of the stroke rod to be displaceable in a longitudinal direction of the neck, and wherein the ejection rod is arranged with the lower end above the tip plunger when the tip plunger is connected to the stroke rod; and a rotating sleeve connected to the ejection rod and configured to displace the ejection rod, wherein the ejection apparatus is configured to press the tip plunger off of the stroke rod and to press the pipette tip off of the neck by displacing the ejection rod downward when the locking sleeve at least partially releases one of: (1) the stroke rod; and (2) the upper end of the tip plunger.

6. The pipette according to claim 1, wherein the neck is configured to positively connect to the pipette tip so that the pipette tip is pushed onto the neck with at least one of: (1) elastic constriction of the neck; and (2) elastic expansion of the pipette tip before being positively connected to the neck.

7. The pipette according to claim 6, further comprising at least one locking sleeve arranged coaxially with the neck and configured to be guided in the pipette housing toward the neck, wherein the at least one locking sleeve is configured to be displaced into a locked position in which the pipette tip one of: (1) borders a neck configured to be constricted by means of a pipette tip being pushed on; and (2) borders a pipette tip that is configured to be expanded by being pushed onto the neck.

8. The pipette tip of claim 7, wherein the locking sleeve inhibits release of the pipette tip that is positively connected to the neck, and wherein the locking sleeve is configured to be displaced upward out of the locked position so that at least one of: (1) the neck is released and is enabled to be deformed radially inward; and (2) the pipette tip is at least partially released and the pipette tip is configured to be detached from the neck.

9. The pipette according to claim 8, wherein the neck defines at least one slot running in a longitudinal direction and wherein at least one of: (1) when the locking sleeve is in the locked position, the locking sleeve borders the neck on an inside; and (2) when the locking sleeve is in the locked position, the locking sleeve is configured to border a pipette tip comprising at least one slot running in the longitudinal direction at the upper end and that is positively connected to the neck.

10. The pipette according to claim 9, wherein the locking sleeve is arranged between the stroke rod and the neck, wherein when the locking sleeve is in the locked position, the locking sleeve borders on an outside of one of: (1) the lower end of the stroke rod; and (2) the upper end of the tip plunger, wherein at a same time the locking sleeve also borders an inside of the neck and inhibits release of a tip plunger positively connected to the stroke rod from the stroke rod, and wherein at the same time, the locking sleeve inhibits the release of a pipette tip from the neck.

11. The pipette according to claim 5, wherein the locking sleeve and the ejection rod are configured to connect to a gear apparatus, wherein the gear apparatus is configured to control displacement of the locking sleeve and the ejection rod in opposite directions when at least one operating element is actuated, wherein the tip plunger is positively connected to the stroke rod and is inhibited from being detached from the stroke rod by the ejection rod being displaced upward and the locking sleeve being displaced downward, and wherein the tip plunger is configured to be detached from the stroke rod and the pipette tip is configured to be detached from the neck by the locking sleeve being displaced upward and the ejection rod being displaced downward.

12. The pipette according to claim 11, wherein when the pipette tip is being pressed off, the gear apparatus is configured to first displace the locking sleeve upward and then configured to press the tip plunger off of the stroke rod and further configured to displace the pipette tip from the neck by displacing the ejection rod downward.

13. The pipette according to claim 11, wherein the at least one operating element controls the displacement of the locking sleeve and the displacement of the ejection rod.

14. The pipette according to claim 11, wherein the at least one operating element controls the drive apparatus.

15. The pipette according to claim 1, wherein the stroke rod is configured to connect to the tip plunger and wherein the tip plunger is configured to be inserted into a portion of the stroke rod prior to being coupled to the stroke rod, wherein the lower end of the stroke rod is configured to elastically expand.

16. The pipette according to claim 1, wherein the stroke rod is configured to be inserted into a portion of the tip plunger prior to being coupled to the tip plunger, and wherein the upper end of the tip plunger is configured to elastically expand.

* * * * *